(12) United States Patent
Trongjitwikrai et al.

(10) Patent No.: US 7,921,543 B2
(45) Date of Patent: Apr. 12, 2011

(54) METHOD OF MANUFACTURING A DISK DRIVE USING A MEDIA COVER

(75) Inventors: Suwan Trongjitwikrai, Bangkok (TH); Pranee Thonghara, Phatumtani (TH); Chanidapa Tangjitwatanakorn, Bangkok (TH); Komgrit Sungkhaphong, Bangkok (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/611,032

(22) Filed: Nov. 2, 2009

(65) Prior Publication Data

US 2010/0095516 A1    Apr. 22, 2010

Related U.S. Application Data

(62) Division of application No. 11/544,818, filed on Oct. 5, 2006, now abandoned.

(51) Int. Cl.
*G11B 5/127*    (2006.01)
*H04R 31/00*    (2006.01)

(52) U.S. Cl. .............. 29/603.03; 29/603.04; 29/603.06; 29/603.07; 29/737; 360/97.01; 360/97.02

(58) Field of Classification Search .. 29/603.03–603.07, 29/737; 360/97.01, 97.02
See application file for complete search history.

(56) References Cited

U.S. PATENT DOCUMENTS

| | | |
|---|---|---|
| 4,714,972 A | 12/1987 | Biermeier et al. |
| 4,814,913 A | 3/1989 | Mihara et al. |
| 5,060,095 A | 10/1991 | Rigotti et al. |
| 5,216,662 A * | 6/1993 | Stefansky et al. ............ 720/673 |
| 5,491,607 A | 2/1996 | Bennett et al. |
| 5,613,292 A | 3/1997 | Bennett et al. |
| 5,942,820 A * | 8/1999 | Yoshida ...................... 310/67 R |
| 6,571,591 B2 * | 6/2003 | Itaya ............................... 72/137 |
| 6,862,156 B1 | 3/2005 | Lin et al. |
| 7,490,398 B1 * | 2/2009 | Klassen et al. ............. 29/603.04 |
| 2005/0185327 A1 | 8/2005 | Voights et al. |
| 2007/0127154 A1 | 6/2007 | Kim et al. |

OTHER PUBLICATIONS

Office Action dated Jun. 5, 2009 from U.S. Appl. No. 11/544,818, filed Oct. 5, 2006, 6 pages.
Office Action dated Jul. 23, 2009 from U.S. Appl. No. 11/544,818, filed Oct. 5, 2006, 10 pages.
Office Action dated Oct. 1, 2009 from U.S. Appl. No. 11/544,818, filed Oct. 5, 2006, 4 pages.
English translation of Office Action dated Oct. 20, 2010, issued in coresponding Chinese Patent Application No. 200710102264.8, filed May 9, 2007, 4 pages.

* cited by examiner

*Primary Examiner* — Paul D Kim

(57) ABSTRACT

A method of manufacturing a disk drive is disclosed. After installing at least one disk into a base, a media cover is coupled to the base, wherein the media cover covers at least a portion of the disk. After coupling the media cover to the base, a head coupled to an actuator arm and a voice coil motor for rotating the actuator arm about a pivot is installed into the base. After installing into the base the head coupled to the actuator arm and the voice coil motor, the media cover is removed from the base. After removing the media cover from the base, a HDA cover is coupled to the base to form a head disk assembly (HDA).

2 Claims, 4 Drawing Sheets

METHOD OF MANUFACTURING A DISK DRIVE USING A MEDIA COVER

CROSS-REFERENCE TO RELATED APPLICATIONS

This application is a divisional of U.S. patent application Ser. No. 11/544,818, filed Oct. 5, 2006 now abandoned, which is incorporated herein by reference in its entirety.

BACKGROUND

FIG. 1 shows an exploded view of a prior art disk drive comprising a disk 2 rotated by a spindle motor 4, and a head 6 coupled to a distal end of an actuator arm 8 which is rotated about a pivot 10 by a voice coil motor (VCM) in order to actuate the head 6 over the disk 2. The disk 2, spindle motor 4, head 6, actuator arm 8, and VCM are enclosed in a head disk assembly (HDA) comprising a base 9 and a cover 11. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp located at the outer periphery of the disk 2 when the disk drive is powered down.

During manufacturing, the HDA is passed through an assembly line of "stations" each responsible for installing particular components using appropriate installation tools. For example, one manufacturing station may install the spindle motor 4 into the base 9, another station may clamp the disk 2 to the spindle motor 4, another station may install the head stack assembly (actuator arm 8, head 6, voice coil 12), another station may install the crash stop 18, another station may install the yoke 14 of the VCM, and another station may install the HDA cover 11. Although manufacturing the HDA typically occurs in a clean room environment, there is still a risk that particles will contaminate the surface of the disk 2 as the HDA passes through the various manufacturing stations.

There is, therefore, a need to protect against particles contaminating the disk surfaces while manufacturing the HDA of a disk drive.

DETAILED DESCRIPTION OF EMBODIMENTS OF THE INVENTION

Figure 1:
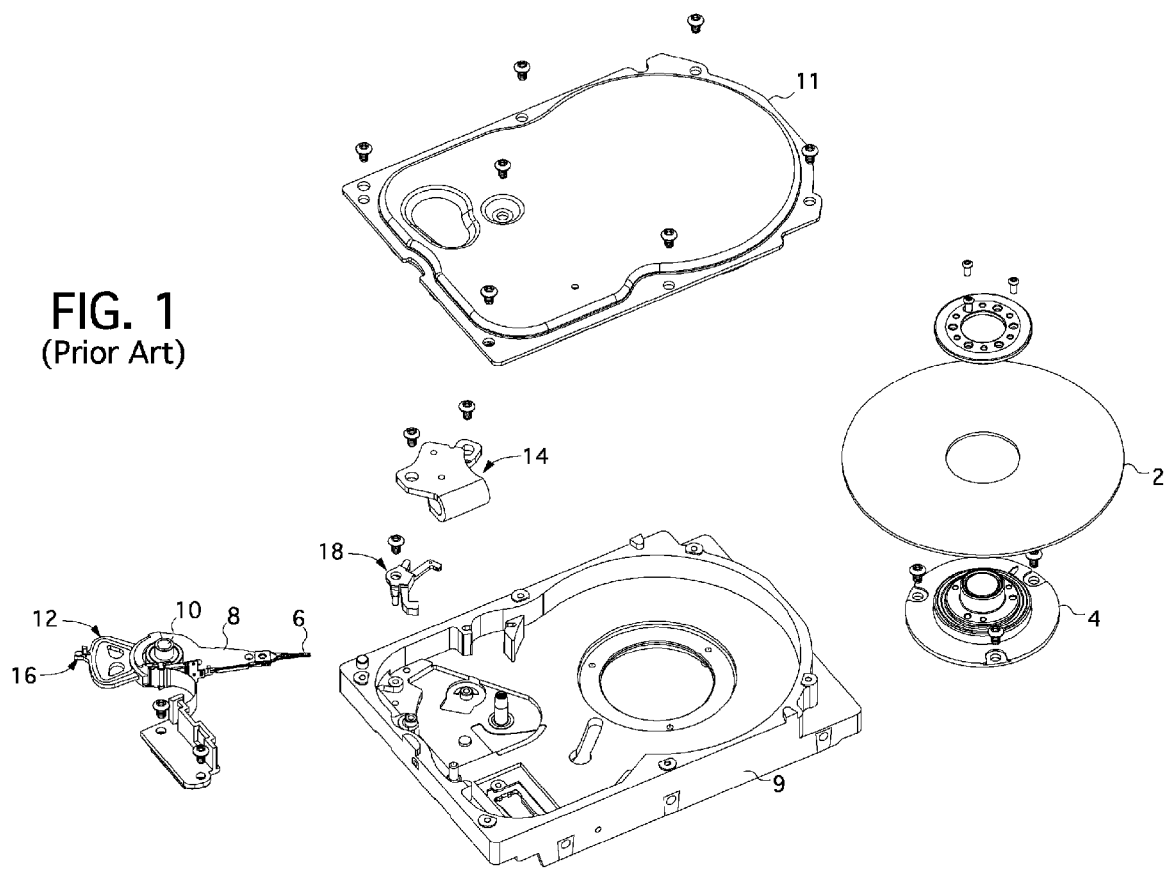
FIG. 1 shows an exploded view of a prior art disk drive comprising a disk, a head coupled to a distal end of an actuator arm, and a voice coil motor installed into a base and enclosed with a cover to form a head disk assembly (HDA).
Figure 2A:
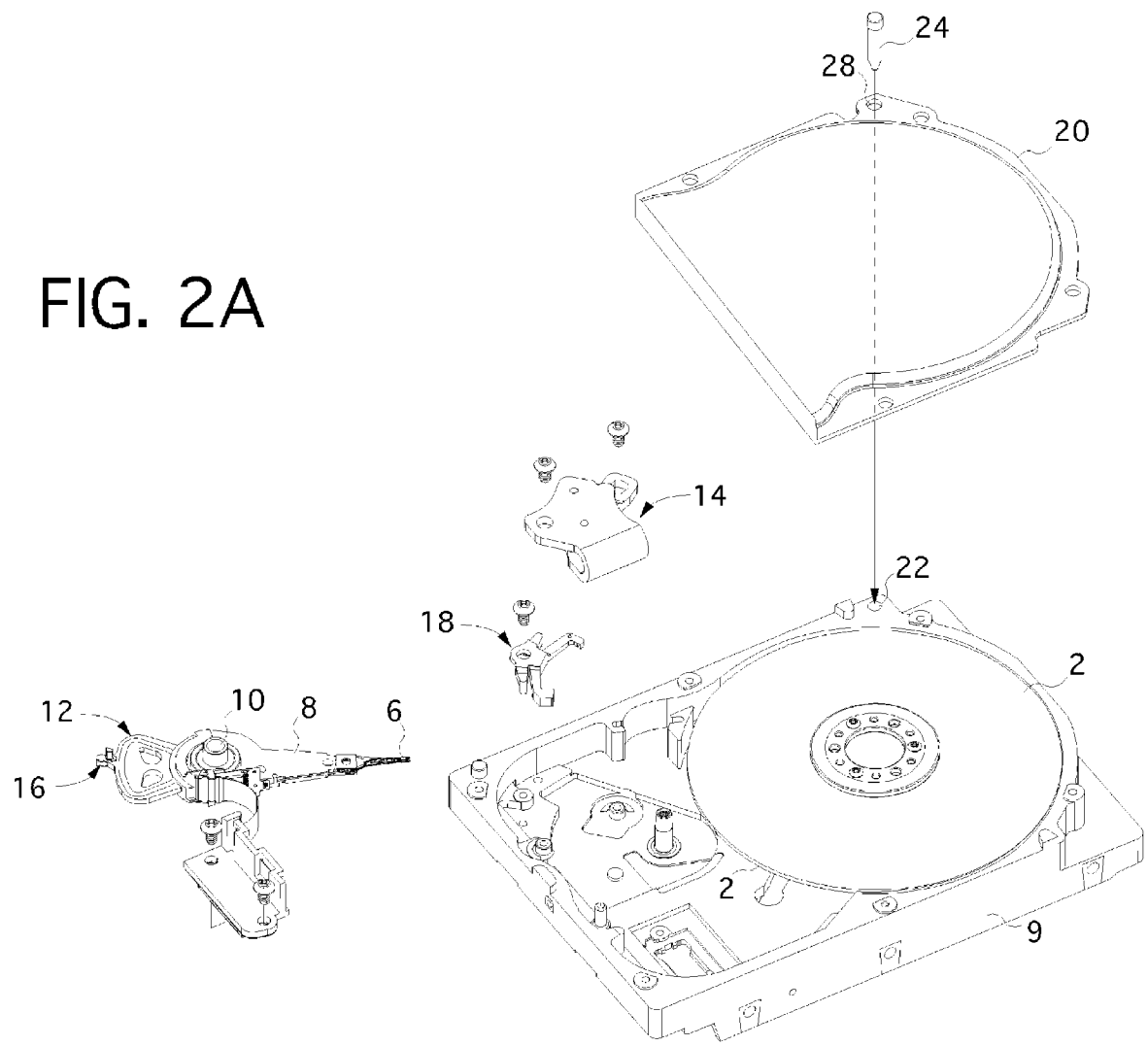
FIG. 2A is an exploded view of a disk drive according to a embodiment of the present invention comprising a media cover coupled to the base and covering at least a portion of the disk while leaving a portion of the base uncovered.
Figure 2B:
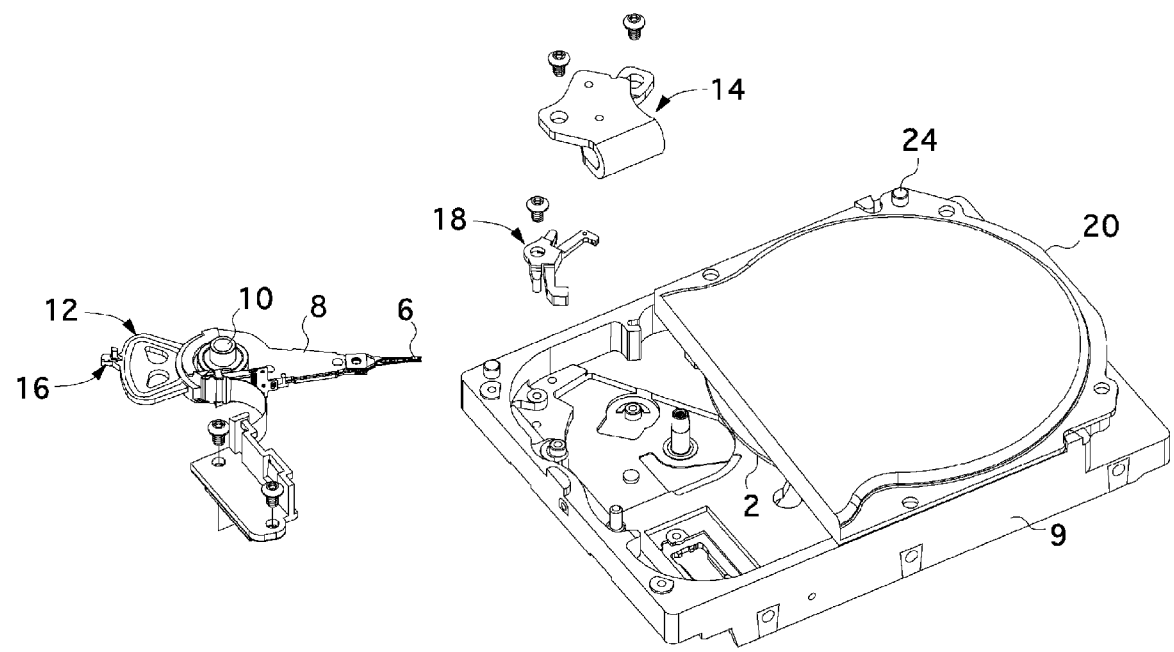
FIG. 2B illustrates how the uncovered portion of the media cover is shaped so that the actuator arm and voice coil motor fit through the uncovered portion when installed into the base.
Figure 2C:
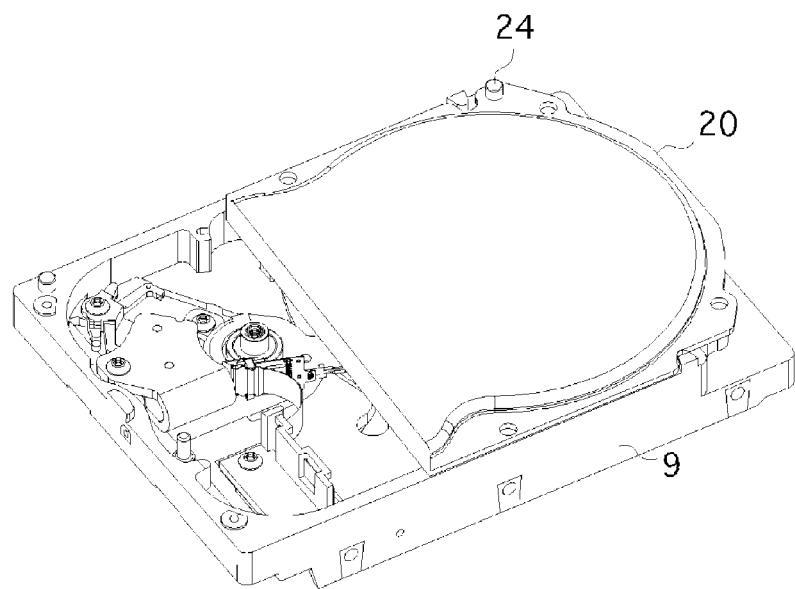
FIG. 2C shows the media cover coupled to the base after installing the actuator arm and voice coil motor.
Figure 3:
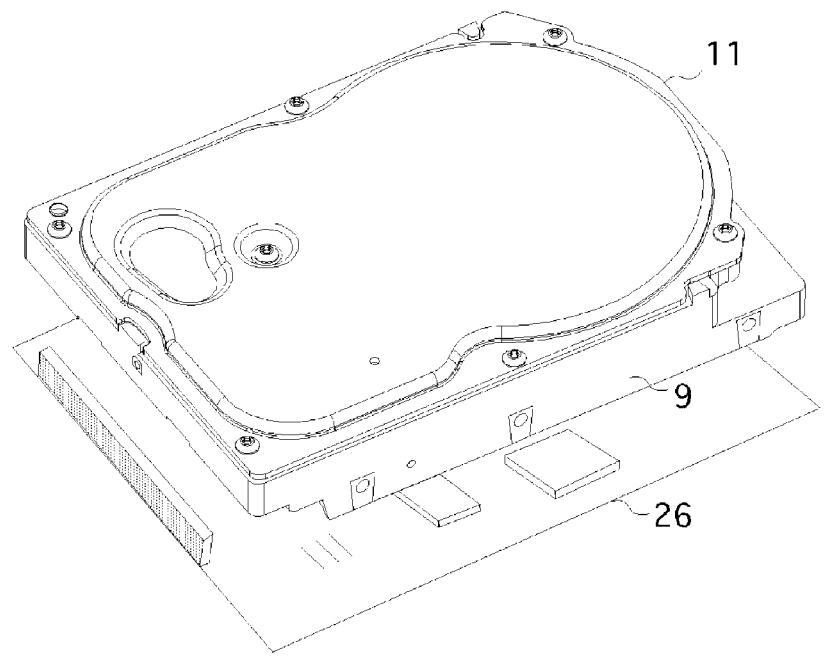
FIG. 3 illustrates an embodiment of the present invention wherein after removing the media cover and coupling the HDA cover to the base, a printed circuit board is coupled to the base using the same aperture for coupling the media cover to the base.

FIGS. 2A-2C illustrate an embodiment of the present invention as a method of manufacturing a disk drive. FIG. 2A shows at least one disk 2 is installed into a base 9, and a media cover 20 is coupled to the base 9, wherein the media cover 20 covers at least a portion of the disk 2 (FIG. 2B). FIGS. 2B and 2C shows how after installing the media cover 20, a head coupled 6 to an actuator arm 8 and a voice coil motor for rotating the actuator arm 8 about a pivot 10 are installed into the base 9. The media cover 20 is then removed and an HDA cover 11 is coupled to the base to form a head disk assembly (HDA) as shown in FIG. 3.

The voice coil motor may comprise any suitable components, but typically includes a voice coil 12 coupled to the base of the actuator arm 8 and a yoke 14. In the embodiment of FIG. 2A, the yoke 14 comprises a suitable flux conductor (e.g., metal) bent into an arc shape and comprising one or more magnets (not shown). In other embodiments, the yoke 14 may comprise top and bottom metal plates with attached magnets. In addition, a crash stop 18 may optionally be installed into the base 9 for limiting the movement of the actuator arm 8, wherein the crash stop 18 may also comprise any suitable configuration.

In the embodiment shown in FIG. 2A, the base comprises an aperture 22, and coupling the media cover 20 to the base 9 comprises inserting a pin 24 into the aperture 22. In one embodiment, the pin 24 is first inserted into the media cover 20, and then the media cover 20 is coupled to the base 9 by inserting the pin 24 into the aperture 22. In another embodiment, the media cover 20 is placed onto the base 9 and then the pin 24 is inserted through the media cover 20 and into the aperture in order to couple the media cover 20 to the base 9.

In one embodiment, the aperture 22 for coupling the media cover 20 to the base 9 (FIG. 2A) is also for coupling a printed circuit board to the base 9 after removing the media cover 20. FIG. 3 shows an example of this embodiment wherein a printed circuit board 26 is coupled to the bottom of the base 9 after installing the HDA cover 11. The aperture 22 (FIG. 2A) for coupling the media cover 20 extends through to the bottom of the base 9, and a screw (or other suitable fastener) is screwed into the aperture 22 to couple the printed circuitry board 26 to the base 9.

The media cover 20 may be formed from any suitable material (e.g., plastic, metal, etc.), and in one embodiment, the media cover 20 is formed from a portion of an HDA cover 11. For example, an HDA cover 11 may be cut or stamped to form a suitably shaped media cover 20, including the hole 28 for inserting the pin 24 in the embodiment of FIG. 2A.

The media cover 20 may cover the entire disk 2 or a portion of the disk 2, and in the embodiment shown in FIG. 2B, the media cover 20 covers a substantial portion of the disk 2. In other embodiments, the media cover 20 may cover less of the disk 2 and may also comprise other openings or features that facilitate installation tools and/or other disk drive components. For example, the media cover 20 may cover less of the disk 2 to facilitate a merge tool for merging the head 6 with the disk 2. The media cover 20 may also comprise one or more "cut-outs" to facilitate installation of other components, such as a ramp near the outer periphery of the disk 2 in disk drives that employ ramp load/unload.

What is claimed is:

1. A method of manufacturing a disk drive, the method comprising:
   installing at least one disk into a base;
   after installing the disk into the base, coupling a media cover to the base, wherein the media cover covers at least a portion of the disk;
   after coupling the media cover to the base, installing into the base a head coupled to an actuator arm and a voice coil motor for rotating the actuator arm about a pivot;
   after installing into the base the head coupled to the actuator arm and the voice coil motor, removing the media cover from the base; and
   after removing the media cover from the base, coupling a HDA cover to the base to form a head disk assembly (HDA).

2. The method as recited in claim 1, wherein:
   the base comprises an aperture;
   coupling the media cover to the base comprises inserting a pin into the aperture; and
   removing the media cover comprises removing the pin from the aperture.

\* \* \* \* \*